US011696048B1

(12) United States Patent
Rahman et al.

(10) Patent No.: US 11,696,048 B1
(45) Date of Patent: Jul. 4, 2023

(54) PIXEL ARRANGEMENT AND METHOD FOR OPERATING A PIXEL ARRANGEMENT

(71) Applicant: ams Sensors USA Inc., Plano, TX (US)

(72) Inventors: Muhammad Maksudur Rahman, Fremont, CA (US); Denver Lloyd, Boise, ID (US); Scott Johnson, Boise, ID (US); Adi Xhakoni, Kessel Lo (BE)

(73) Assignee: ams Sensors USA Inc., Plano, TX (US)

( * ) Notice: Subject to any disclaimer, the term of this patent is extended or adjusted under 35 U.S.C. 154(b) by 0 days.

(21) Appl. No.: 17/709,518

(22) Filed: Mar. 31, 2022

(51) Int. Cl.
| | |
|---|---|
| *H04N 25/77* | (2023.01) |
| *H04N 25/57* | (2023.01) |
| *H04N 25/71* | (2023.01) |
| *H04N 25/771* | (2023.01) |
| *H04N 25/778* | (2023.01) |
| H04N 25/67 | (2023.01) |

(52) U.S. Cl.
CPC ........... *H04N 25/57* (2023.01); *H04N 25/745* (2023.01); *H04N 25/771* (2023.01); *H04N 25/778* (2023.01); *H04N 25/67* (2023.01)

(58) Field of Classification Search
CPC .... H04N 25/57; H04N 25/745; H04N 25/771; H04N 25/778; H04N 25/67
See application file for complete search history.

(56) References Cited

U.S. PATENT DOCUMENTS

| 10,103,193 B1 | 10/2018 | Manabe et al. |
| 2011/0157441 A1 | 6/2011 | Okita et al. |
| 2017/0099422 A1* | 4/2017 | Goma ..................... H04N 25/57 |
| 2017/0272667 A1* | 9/2017 | Hynecek ........... H01L 27/14636 |
| 2019/0273879 A1 | 9/2019 | Xu et al. |
| 2021/0014438 A1* | 1/2021 | Yang ................. H01L 27/14612 |
| 2022/0286632 A1* | 9/2022 | Lloyd .................. H04N 25/445 |

FOREIGN PATENT DOCUMENTS

| CN | 112670308 A | 4/2021 |
| EP | 2063632 A1 | 5/2009 |
| EP | 3605606 A1 | 2/2020 |

OTHER PUBLICATIONS

Xu, Chen et al., "A Stacked Global-Shutter CMOS Imager with SC-Type Hybrid-GS Pixel and Self-Knee Point Calibration SingleFrame HDR and On-Chip Binarization Algorithm for Smart Vision Applications", 2019 IEEE International Solid-State Circuits Conference, Feb. 18, 2019, 3 pages.

Meynants, Guy et al., "Backside illuminated global shutter CMOS image sensors", 2011 International Image Sensor Workshop, Jun. 8-11, 2011, 4 pages.

(Continued)

*Primary Examiner* — Kelly L Jerabek
(74) *Attorney, Agent, or Firm* — Viering, Jentschura & Partner MBB (57) ABSTRACT

A pixel arrangement comprises a photodiode, a circuit node, a transfer transistor coupled to the photodiode and to the circuit node, an amplifier with an input coupled to the circuit node, a first and a second capacitor, a first transistor coupled to an output of the amplifier and to the first capacitor, a second transistor coupled to the first transistor and to the second capacitor, and a coupling transistor coupled to the circuit node and to the second capacitor.

19 Claims, 8 Drawing Sheets

(56) References Cited

OTHER PUBLICATIONS

Miyauchi, Ken et al., "4.0μm Stacked Voltage Mode Global Shutter Pixels with A BSI LOFIC and A PDAF Capability", Brillnics, 2021, 4 pages.
Fowler, Boyd, "High Dynamic Range Backside Illuminated Voltage Mode Global Shutter CIS for in Cabin Monitoring", AutoSens Brussels, Sep. 2021, 26 pages, Omnivision.
DE102021120779.7, Priority date: Aug. 10, 2021, 52 pages, not published yet.
U.S. Appl. No. 63/263,861, filed Nov. 10, 2021, 27 pages, not published yet.
International search report for corresponding PCT Application No. PCT/US2023/017009 dated May 23, 2023 3 pages.

\* cited by examiner

PIXEL ARRANGEMENT AND METHOD FOR OPERATING A PIXEL ARRANGEMENT

TECHNICAL FIELD

Various embodiments of the present disclosure relate to a pixel arrangement, an image sensor and a method for operating a pixel arrangement.

BACKGROUND

An image sensor typically includes an array of pixel arrangements. A high dynamic range for the conversion of electromagnetic radiation into an electrical signal is beneficial. However, a size of a pixel arrangement has to be kept small.

SUMMARY

In an embodiment of the present disclosure, a pixel arrangement comprises a photodiode, a circuit node, a transfer transistor coupled to the photodiode and to the circuit node, an amplifier with an input coupled to the circuit node, a first and a second capacitor, a first transistor coupled to an output of the amplifier and to the first capacitor, a second transistor coupled to the first transistor and to the second capacitor, and a coupling transistor coupled to the circuit node and to the second capacitor.

Advantageously, the circuit node has a capacitive characteristic. The circuit node has a capacitance such as e.g. a diffusion capacitance or a floating diffusion capacitance. Thus, charge of the capacitance at the circuit node can be provided to the second capacitor via the coupling transistor or via the amplifier and the first and/or the second transistor. Thus, charge provided by the photodiode can be detected with high sensitivity by amplifying with the amplifier and with low sensitivity by directly providing charge to the second capacitor. The pixel arrangement can be realized in a small area. Hence pixel size and chip area can be reduced and the pixel arrangement still offers high dynamic range (abbreviated HDR) with low fixed pattern noise (abbreviated FPN).

In an embodiment, the pixel arrangement further comprises a supply terminal and a reset transistor coupled to the circuit node and to the supply terminal. The reset transistor is configured to couple the circuit node to the supply terminal, e.g. in a reset phase.

In an embodiment, the pixel arrangement further comprises a reference potential terminal and a further reset transistor coupled to the output of the amplifier and to the reference potential terminal. The further reset transistor is configured to discharge the first capacitor or the second and the first capacitor.

In an embodiment of the pixel arrangement, the first capacitor comprises a first electrode coupled to a node between the first transistor and the second transistor and a second electrode coupled to the reference potential terminal. The second capacitor comprises a first electrode coupled to a node between the second transistor and the coupling transistor and a second electrode coupled to the reference potential terminal. The first transistor is configured to couple the first capacitor to the output of the amplifier. The second transistor is configured to couple the first capacitor to the second capacitor.

In an embodiment of the pixel arrangement, a supply voltage is tapped at the supply terminal. A reference potential is tapped at the reference potential terminal. The supply voltage is positive with respect to the reference potential.

In an embodiment of the present disclosure, the pixel arrangement further comprises a further photodiode and a further transfer transistor that is coupled to the further photodiode and to the circuit node. In an example, different exposure times can be used for the photodiode and for the further photodiode.

In an embodiment of the pixel arrangement, the amplifier includes an amplifier transistor having a control terminal coupled to the input of the amplifier, a first terminal coupled to the supply terminal and a second terminal coupled to the output of the amplifier.

In an embodiment of the present disclosure, the pixel arrangement further comprises a column line and a further amplifier having an input coupled to the second capacitor and an output coupled to the column line.

In an embodiment of the pixel arrangement, the further amplifier includes a further amplifier transistor having a control terminal coupled to the input of the amplifier, a first terminal coupled to the supply terminal and a second terminal coupled to the output of the amplifier.

In an embodiment of the present disclosure, the pixel arrangement further comprises a select transistor coupled to the column line and to the output of the further amplifier. Advantageously, the second capacitor is coupled to the column line via the further amplifier and the select transistor.

In an embodiment of the present disclosure, the pixel arrangement further comprises an additional amplifier having an input coupled to the first capacitor and an output coupled to the column line.

In an embodiment of the present disclosure, the pixel arrangement further comprises an additional select transistor coupled to the column line and to the output of the additional amplifier. Advantageously, the first capacitor and the second capacitor can be separately coupled to the column line.

In an embodiment of the present disclosure, an image sensor comprises an array of pixel arrangements, e.g. an n times m array of pixel arrangements.

In an embodiment of the present disclosure, the image sensor further comprises a timing generator configured to provide a transfer signal to a control terminal of the transfer transistor. A first pulse of the transfer signal has a first voltage value. A second pulse of the transfer signal has a second voltage value. The first voltage value and the second voltage value are different. The first and the second pulse are e.g. in a storage phase. In an example, in the storage phase charge is stored in the second capacitor depending at least on the first pulse and further charge is stored in the first capacitor depending at least on the second pulse. The charge and the further charge e.g. depend on an illumination of the photodiode, the first voltage value, the second voltage value, the timing of the first and of the second pulse etc.

In an embodiment of the image sensor, the second pulse follows the first pulse.

In an embodiment of the present disclosure, a method for operating a pixel arrangement comprises:
converting electromagnetic radiation into charge by a photodiode,
providing a pulse of a reset signal to a reset transistor and a pulse of a coupling signal to a coupling transistor for providing a supply voltage to a capacitance of a circuit node and a second capacitor,
providing a first pulse of a transfer signal to a transfer transistor and a pulse of the coupling signal to the coupling transistor for transferring charge from the photodiode to the capacitance of the circuit node and to the second capacitor, providing a second pulse of the transfer signal to the transfer transistor for transferring further charge from the photodiode to the capacitance of the circuit node, and amplifying a capacitance voltage that is tapped at the capacitance of the circuit node and providing an amplified capacitance voltage to a first capacitor by providing a pulse of a first control signal to a first transistor.

Advantageously, the method can achieve a high dynamic range image with relatively small pixel size. The number of capacitors in a pixel is kept small.

In an example, the electromagnetic radiation is converted into charge by the photodiode in an exposure phase. The above mentioned pulses of the reset signal, the coupling signal, the transfer signal and the first control signal are performed in a storage phase following the exposure phase.

The pixel arrangement and the image sensor described above are particularly suitable for the method of operating a pixel arrangement. Features described in connection with the pixel arrangement and the image sensor can therefore be used for the method and vice versa.

In an embodiment of the method, there is a capacitance at the circuit node. The capacitance is e.g. a diffusion capacitance or a floating diffusion capacitance. The circuit node may be named diffusion node or floating diffusion node. In an example, there is no discrete capacitor connected to the circuit node. The capacitance results e.g. only from at least one parasitic capacitance.

In an embodiment of the method, the first pulse of the transfer signal has a first voltage value and the second pulse of the transfer signal has a second voltage value. The first voltage value is different from the second voltage value. The first and the second pulse are e.g. in the storage phase. The transfer transistor has a controlled path. The controlled path has a lower conductance value at the first voltage value as the controlled path at the second voltage value. The controlled path is a barrier for a flow of charge between the photodiode and the capacitance of the circuit node. The first pulse results in a higher barrier that the second pulse. The transfer signal realizes a barrier modulation of the barrier resulting from the transfer transistor.

In an embodiment of the method, in a readout phase, first the second capacitor is readout via a column line and then the first capacitor is readout via the column line. In a first phase during the readout phase the second capacitor which stores a low sensitivity signal is read out, and in a second phase during the readout phase the first capacitor which stores a high sensitivity signal is read out.

In an embodiment of the method, in the readout phase, the capacitance of the circuit node is reset and a reset level is read out via the column line.

In an embodiment of the method, during converting electromagnetic radiation into charge by the photodiode, a first number M of pulses of the reset signal and a first number M of pulses of the transfer signal are provided. A pulse of the reset signal and a pulse of the transfer signal are provided at the same time and/or overlap. These pulses are in an exposure phase. Thus, the photodiode is coupled to the supply terminal via the transfer transistor and the reset transistor for a first number M of times. The first number M is e.g. 1, 2 or 3. The first number M is e.g. larger than 1 or larger than 2. Charge of the photodiode is thrown away to the supply terminal. The voltage values of the number M of pulses of the transfer signal are equal or include at least two different values. Thus, a barrier provided by the transfer transistor is modulated.

In an embodiment, the method further comprises determining based on an amplitude level in the first phase during pixel readout and on an amplitude level in the second phase during pixel readout, whether to use the low sensitivity signal or the high sensitivity signal for further processing.

In an embodiment of the present disclosure, the pixel arrangement implements a high-dynamic-range self-calibrating barrier-modulation pixel with low area.

The pixel arrangement is configured for imaging as an application.

In an embodiment of the present disclosure, the image sensor is realized as complementary metal-oxide-semiconductor image sensor, abbreviated CMOS integrated sensor or CIS. The image sensor can be used in artificial reality (abbreviated AR), virtual reality (abbreviated VR), automotive and other image sensor applications.

In an embodiment of the present disclosure, the transfer transistor, the coupling transistor, the reset transistor, the further reset transistor, the first transistor, the second transistor and the select transistor are realized as metal-oxide-semiconductor field-effect transistors, abbreviated MOSFETs. Each of them is realized as n-channel MOSFET.

Advantageously, the pixel arrangement can have a small size (thus resulting in a smaller chip) that can achieve a high dynamic range imaging. The image sensor operates using a global shutter method, e.g. a voltage domain global shutter method.

The pixel arrangement can use one capacitor that is operated for voltage domain global shutter also for calibrating a knee-point of barrier modulation. The pixel arrangement and the image sensor ensure low FPN in knee-point, while taking less area as the capacitor is re-used. One of the two capacitors which are implemented for voltage domain global shutter is reused.

BRIEF DESCRIPTION OF THE DRAWINGS

The following description of figures of examples or embodiments may further illustrate and explain aspects of the pixel arrangement, the image sensor and the method for operating a pixel arrangement. Arrangements, devices and circuit blocks with the same structure and the same effect, respectively, appear with equivalent reference symbols. In so far as arrangements, devices and circuit blocks correspond to one another in terms of their function in different figures, the description thereof is not repeated for each of the following figures.

DETAILED DESCRIPTION OF ILLUSTRATIVE EMBODIMENTS

Figure 1A:
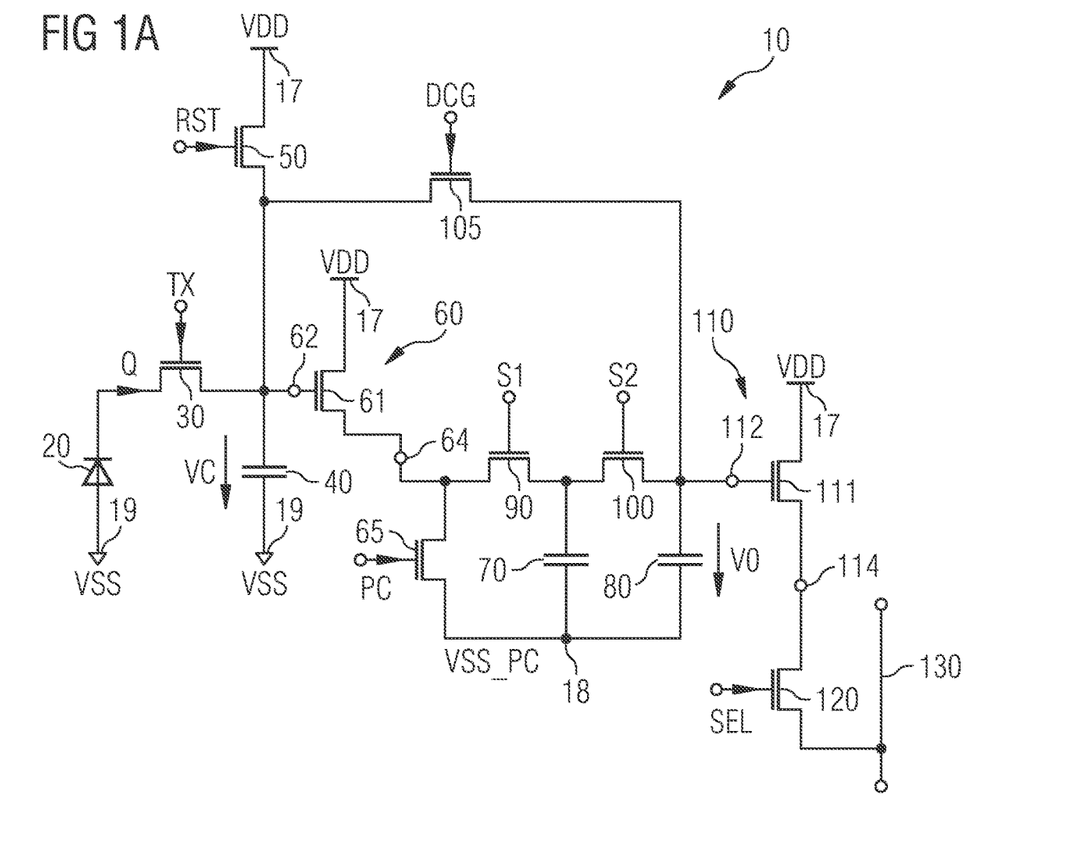
FIGS. 1A to 1E show an exemplary embodiment of a pixel arrangement.

FIG. 1A shows an exemplary embodiment of a pixel arrangement 10. The pixel arrangement 10 comprises a photodiode 20, a circuit node, and a transfer transistor 30 coupled to the photodiode 20 and to the circuit node. A controlled path of the transfer transistor 30 connects a first terminal of the photodiode 20 to the circuit node. The transfer transistor 30 can also be named transfer gate. The first terminal of the photodiode 20 is a cathode. A second terminal of the photodiode 20 is an anode. The pixel arrangement 10 includes an amplifier 60 with an input 62 coupled to the circuit node. The circuit node has a capacitance 40 which is e.g. a floating diffusion capacitance. The circuit node is connected to or is equal with a first terminal of the capacitance 40.

The pixel arrangement 10 includes a first capacitor 70, a second capacitor 80, a first transistor 90 and a second transistor 100. The first and the second transistor 90, 100 can be named first and second switch. The first transistor 90 is coupled to an output 64 of the amplifier 60 and to the first capacitor 70. A controlled path of the first transistor 90 connects the output 64 of the amplifier 60 to a first electrode of the first capacitor 70. The second transistor 100 is coupled to the first transistor 90 and to the second capacitor 80. A controlled path of the second transistor 100 connects a terminal of the first transistor 90 to a first electrode of the second capacitor 80. Thus, the controlled path of the second transistor 100 connects the first electrode of the first capacitor 70 to the first electrode of the second capacitor 80.

Moreover, the pixel arrangement 10 comprises a coupling transistor 105. The coupling transistor 105 is coupled to the circuit node and to the second capacitor 80. Thus, a first terminal of the coupling transistor 105 is connected to the circuit node. The first terminal of the coupling transistor 105 is connected to the input 62 of the amplifier 60. A second terminal of the coupling transistor 105 is connected to the first electrode of the second capacitor 80. The second terminal of the coupling transistor 105 is connected to a second terminal of the second transistor 100.

The pixel arrangement 10 further comprises a supply terminal 17 and a reset transistor 50. The reset transistor 50 is coupled to the circuit node and to the supply terminal 17. The pixel arrangement 10 further includes a column line 130 and a further amplifier 110. The further amplifier 110 has an input 112 and an output 114. The input 112 of the further amplifier 110 is coupled to the second capacitor 80. Thus, the input 112 of the further amplifier 110 is connected to the first electrode of the second capacitor 80, to the second terminal of the coupling transistor 105 and to the second terminal of the second transistor 100. The output 114 of the further amplifier 110 is coupled to the column line 130.

The pixel arrangement 10 comprises a select transistor 120 coupled to the column line 130 and to the output 114 of the further amplifier 110. The pixel arrangement 10 further comprises a further reset transistor 65 coupled to the output 64 of the amplifier 60 and to a reference potential terminal 18 of the pixel arrangement 10.

The first electrode of the first capacitor 70 is coupled to a node between the first transistor 90 and the second transistor 100. A second electrode of the first capacitor 70 is coupled to the reference potential terminal 18. The first electrode of the second capacitor 80 is coupled to a node between the second transistor 100 and the coupling transistor 105. A second electrode of the second capacitor 80 is coupled to the reference potential terminal 18. The second terminal of the photodiode 20 is connected to a ground terminal 19. A second terminal of the capacitance 40 is connected to the ground terminal 19. The reference potential terminal 18 is connected to the ground terminal 19 or is not connected to the ground terminal 19.

The amplifier 60 includes an amplifier transistor 61 having a control terminal coupled to the input 62 of the amplifier 60. A first terminal of the amplifier transistor 61 is coupled to the supply terminal 17. A second terminal of the amplifier transistor 61 is coupled to the output 64 of the amplifier 60.

The further amplifier 110 includes a further amplifier transistor 111 having a control terminal coupled to the input 112 of the amplifier 110. A first terminal of the further amplifier transistor 111 is coupled to the supply terminal 17. A second terminal of the further amplifier transistor 111 is coupled to the output 114 of the amplifier 110.

In an example, the capacitance 40 of the circuit node comprises one or more than one of a capacitance of the control terminal of the amplifier transistor 61, a capacitance of a pn junction of a terminal of the transfer transistor 30, a capacitance of a pn junction of a terminal of the reset transistor 50 and a capacitance of a pn junction of the first terminal of the coupling transistor 105. Thus, parasitic capacitances of the transistors connected to the circuit node may result in the capacitance 40 of the circuit node. The value of the capacitance 40 of the circuit node may be the sum of the values of the parasitic capacitances of the transistors connected to the circuit node. Optionally, the pixel arrangement 10 includes e.g. a capacitor connected to the circuit node; the capacitor may contribute to the capacitance 40.

A supply voltage VDD is tapped at the supply terminal 17. A reference potential VSS_PC is tapped at the reference potential terminal 18. The supply voltage VDD is positive with respect to the reference potential VSS_PC. A ground potential VSS is tapped at the ground terminal 19. The ground potential VSS is equal to or is different from the reference potential VSS_PC.

A timing generator (shown in FIG. 2) is coupled to the control terminal of the transfer transistor 30, the coupling transistor 105, the reset transistor 50, the further reset transistor 65, the first transistor 90, the second transistor 100 and the select transistor 120. The timing generator provides a transfer signal TX to the transfer transistor 30, a coupling signal DCG to the coupling transistor 105, a reset signal RST to the reset transistor 50, a further reset signal PC to the further reset transistor 65, a first control signal S1 to the first transistor 90, a second control signal S2 to the second transistor 100 and a select signal SEL to the select transistor 120.

Figure 1B:
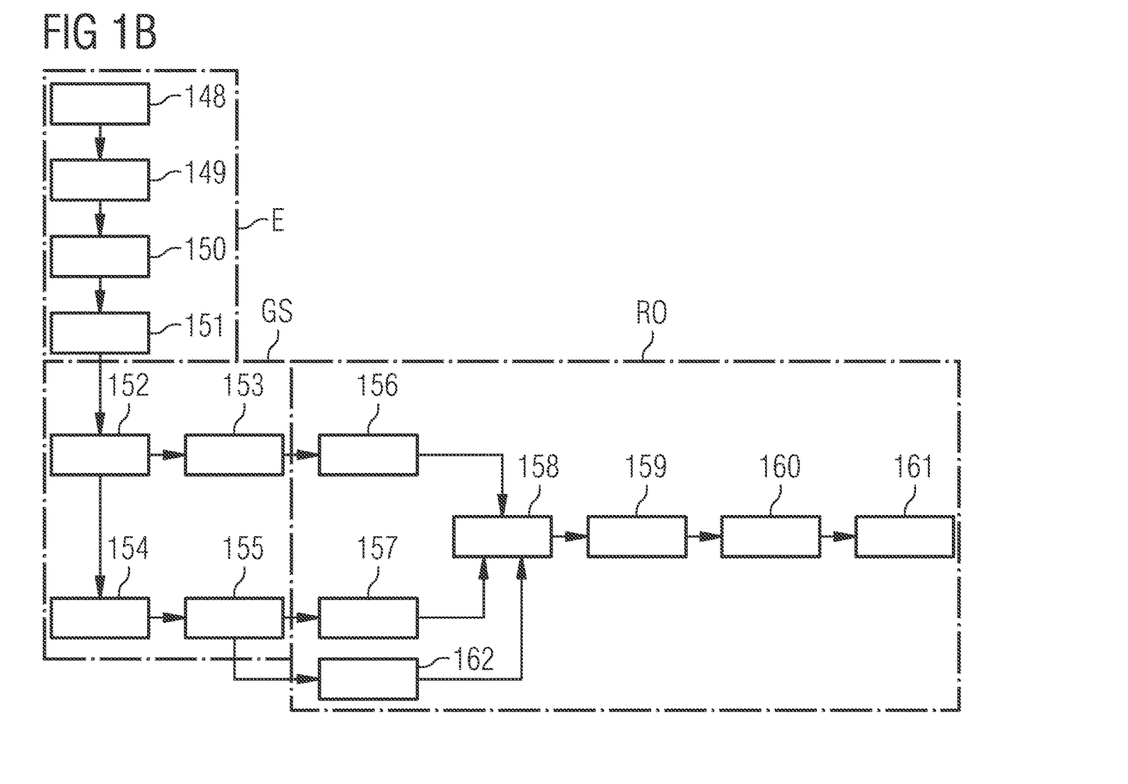
Figure 1C:
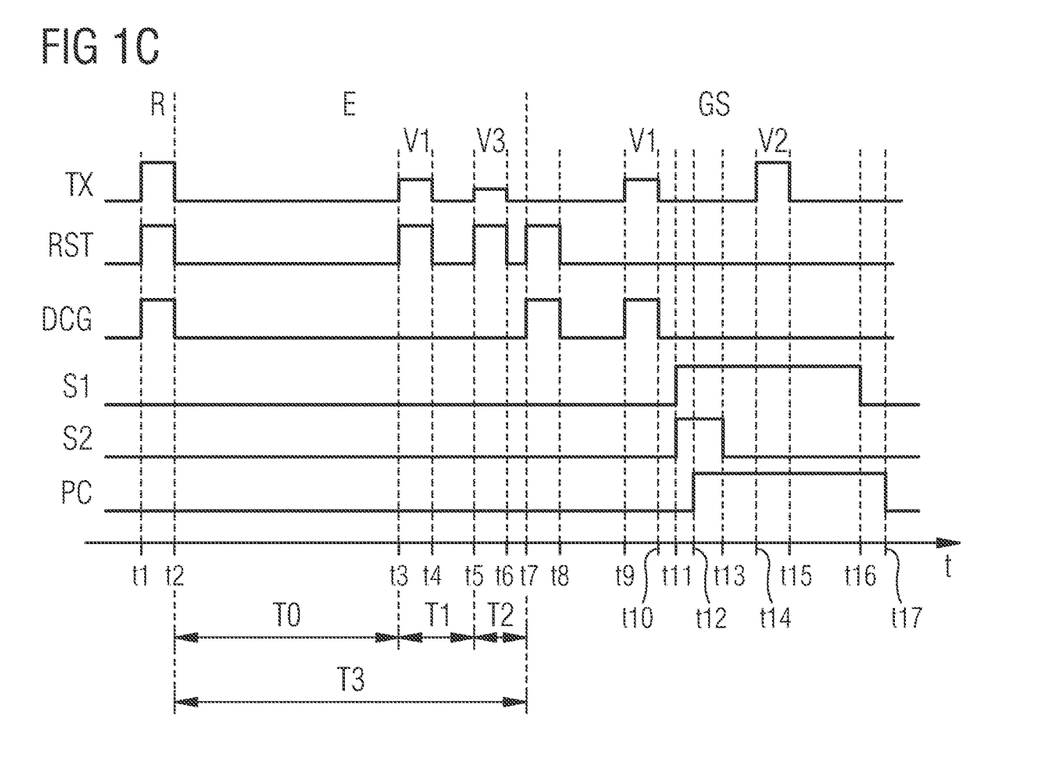
Figure 1D:
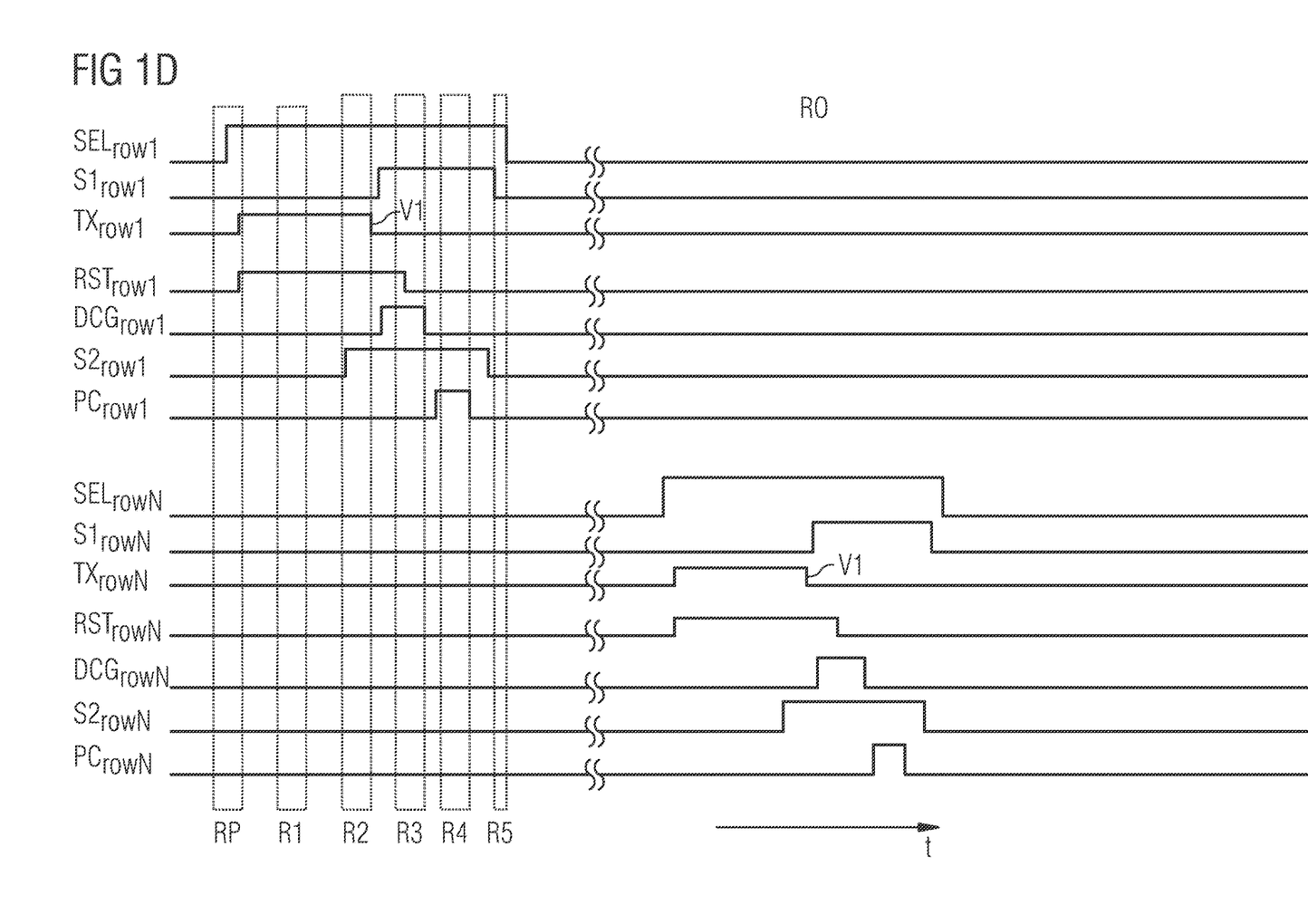

The operation is explained using FIGS. 1B to 1D.

FIG 1B shows an exemplary operation performed by a pixel arrangement 10 which is shown e.g. in FIG. 1A. In FIG. 1B, the operation is shown in blocks. A method for operating the pixel arrangement 10 comprises e.g. the following blocks which can be named procedures or steps:

A storage phase GS follows an exposure phase E. A readout phase RO follows the storage phase GS. There may be a time gap between the storage phase GS and the readout phase RO. A point of time of a start of the readout phase RO is flexible. The readout phase RO operates row by row. At one point of time, one row or more than one row (e.g. every nth row) may be readout. The readout of the pixel arrangements 10 of one row or every nth row of an image sensor is performed at one point of time. Typically, the readout of the pixel arrangements 10 of the other rows of the image sensor is performed at other points of time.

The exposure phase E includes the steps of blocks 148 to 151. The storage phase GS includes the steps of blocks 152 to 155. The readout phase RO includes the steps of blocks 156 to 162.

The exposure phase E can be realized as global exposure phase. The storage phase GS can be realized as global storage phase; in a global storage phase, the storage phase GS of each pixel arrangement 10 of the image sensor is performed in parallel.

Block 148: Start of exposure: Electromagnetic radiation is converted into charge Q by the photodiode 20.

Block 149: Modify the transfer barrier based on a system input: The transfer signal TX that is provided to the transfer transistor 30 controls a barrier between the photodiode 20 and the capacitance 40 of the circuit node. Typically, between two pulses of the transfer signal TX, a voltage value of the transfer signal TX is selected such that the barrier for a flow of charge between the photodiode 20 and the capacitance 40 of the circuit node is high.

Block 150: Part of the charge Q at the photodiode 20 is thrown away ("thrown away" means "is conducted") to the supply terminal 17 with a pulse of the transfer signal TX having a first voltage value V1 and with a pulse of the reset signal RST in the exposure phase E; light integration is kept.

In an example, the first voltage value V1 is less than a transfer gate high bias TXhi. In this case, the charge Q of the photodiode 20 is partially cleared to the supply terminal 17. There is certain amount charge Q left in the photodiode. This level of charge is set by voltage value V1. Only in case the transfer signal TX has the value of the transfer gate high bias TXhi, the charge Q of the photodiode 20 is fully cleared to the supply terminal 17.

Block 151: Another part of the charge Q at the photodiode 20 is thrown away to the supply terminal 17 with a pulse of the transfer signal TX having a further voltage value V3 and with a pulse of the reset signal RST in the exposure phase E; light integration is kept. The first voltage value V1 is different from the further voltage value V3. In an example, the first voltage value V1 results in a lower barrier provided by the transfer transistor 30 than the further voltage value V3; thus V1>V3.

In an example, the third voltage value V3 is less than V1. In this case, the charge Q of the photodiode 20 is partially cleared again. This time remaining charge Q in the photodiode 20 is higher than the remaining charge Q resulted from V1.

Block 152: Transfer of a portion of a charge Q of the photodiode 20 to the capacitance 40 of the circuit node and to the second capacitor 80: A first pulse of the transfer signal TX is provided to the transfer transistor 30 in the storage phase GS. The first pulse of the transfer signal TX has a first voltage value V1. Thus, the portion of the charge Q corresponds to the first voltage value V1. Simultaneously with the first pulse of the transfer signal TX, a pulse of the coupling signal DCG sets the coupling transistor 105 in a conducting state; thus, a capacitance voltage VC at the capacitance 40 of the circuit node and an output voltage VO at the second capacitor 80 equalize. The pulse of the coupling signal DCG is simultaneously with the first pulse of the transfer signal TX. Charge can flow from the photodiode 20 as long as the charge Q of the photodiode 20 can overcome the barrier provided by transfer transistor 30. The second transistor 100 is set in a conducting state. Since the second control signal S2 sets the second transistor 100 in a conducting state, the output voltage VO at the second capacitor is equal to the voltage at the first capacitor 70.

Block 153: Block 153 is partly simultaneous to block 152. The capacitance voltage VC is sampled at the second capacitor 80. This is achieved by setting the first and the second switch 90, 100 and the further reset transistor 65 in a conducting state by the first and the second control signal S1, S2 and the further reset signal PC and afterwards setting the second switch 100 in a non-conducting state by the second control signal S2. Thus, the charge Q is distributed from the capacitance 40 of the circuit node to the first and the second capacitor 70, 80 via the amplifier 60. In block 153, after storage of the charge on the first and the second capacitor 70, 80, the second control signal S2 sets the second transistor 100 in a non-conducting state. Thus, the first capacitor 70 and the second capacitor 80 are decoupled at the end of block 153. The amplifier 60 is realized e.g. as a source follower. The further amplifier 110 is realized e.g. as a source follower.

Block 154: Transfer remaining charge Q to the capacitance 40 of the circuit node: A second pulse of the transfer signal TX is applied to the transfer transistor 30 for transferring further charge Q from the photodiode 20 to the capacitance 40 of the circuit node in the storage phase GS. The second pulse of the transfer signal TX has a second voltage value V2. The first voltage value V1 results in a higher barrier than the second voltage value V2.

In an example, the second voltage value V2 is equal to a transfer gate high bias TXhi. In this case, the charge Q of the photodiode 20 is fully cleared. Every remaining charge Q of the photodiode 20 is conducted to the capacitance 40 of the circuit node.

Block 155: Store charge on the first capacitor 70: A capacitance voltage VC that is tapped at the capacitance 40 of the circuit node is amplified by the amplifier 60. An amplified capacitance voltage is provided to the first capacitor 70 by providing a pulse of the first control signal S1 to the first transistor 90.

Block 156: Readout of the second capacitor 80: An output voltage VO tapped at the second capacitor 80 is amplified by the further amplifier 110. In case or when the select transistor 120 is set in a conducting state, the amplified second voltage is provided to the column line 130 for digitization. A first digitized value is generated as a function of a first value of the output voltage VO, e.g. by an evaluation circuit (shown in FIG. 2). The readout is performed row by row.

Block 157: Readout of the first capacitor 70: The voltage at the first capacitor 70 and the output voltage VO at the second capacitor 80 equalize via the second switch 100 that is set in a conducting state by the second control signal S2. The output voltage VO at the second capacitor 80 is amplified by the further amplifier 110. In case or when the select transistor 120 is set in a conducting state, the amplified second voltage is provided to the column line 130 for digitization row by row. A second digitized value is generated as a function of a second value of the output voltage by the evaluation circuit.

Block 162: The capacitance 40 of the circuit node is reset by setting the coupling transistor 105 in a conducting state by the coupling signal DCG. The capacitance voltage VC is sampled on the first and the second capacitor 70, 80 by setting the first and the second switch 90, 100 and the further reset switch 65 in a conducting state by the first and the second control signal S2, S2 and the further reset signal PC row by row. A third digitized value is generated which represents a reset level. The third digitized value represents an absence of an illumination. The reset level is a "dark" level. The further reset transistor 65 delivers a bias current for the amplifier 60. The first and the second capacitor 70, 80 will be initially discharged. But finally, the output voltage at the second capacitor 80 will settle to a voltage proportional to the capacitance voltage VC at the input 61 of the amplifier 60.

Block 158: Subtract a voltage stored by the first capacitor 70 from a voltage stored by the second capacitor 80 (high conversion gain, abbreviated HCG/calibration level): The subtraction of the voltages is performed in the digital domain: The first digitized value is subtracted from the second digitized value by an evaluation circuit. The result is a low light signal. The low light signal is achieved by the high conversion gain (HCG) and can be used as calibration level. The second digitized value is subtracted from the third digitized value by the evaluation circuit. The result is a high light signal.

Block 159: Gain up low conversion gain (abbreviated LCG).

Block 160: Per pixel knee point calibration.

Block 161: Linearization.

There are two signal values, namely a low light signal and a high light signal. The low light signal is sampled at high conversion gain, abbreviated HCG (meaning voltage is sampled only with the capacitance 40). This signal comes out at a fifteenth point of time t15, shown in FIG. 1C. Difference between the voltage at the first capacitor 70 and the output voltage at the second capacitor 80 gives the low light signal.

The high light signal is sample at low conversion gain, abbreviated LCG (meaning the second capacitor 80 is connected to the circuit node). A difference between two values of the output voltage (e.g. at a second and a sixth point of time t2, t6) provides this high light signal.

Finally in the digital block, these two signal are stitched to make a "light illumination Il versus digital number a straight line". But the two signals are sampled in HCG and LCG mode. So high light signal will be multiplied by HCG and LCG ratio. This will make a straight line. This is called linearization.

Knee point calibration:

When a pulse of the first voltage value V1 or of the third voltage value V3 is applied to the transfer transistor 30 to throw charge of the photodiode 20 to the supply terminal 17 to extend dynamic range, each pixel will have different remaining charge in the photodiode 20 depending on a threshold voltage of the transfer transistor 30. The variation of the threshold voltage would introduce higher fixed pattern noise (abbreviated FPN) after linearization. Advantageously, an additional pulse of the transfer signal TX with the first voltage value V1 is provided at a ninth point of time t9 (shown in FIG. 1C). Now there is exact number left in the photodiode 20 since the pulse with the first voltage value V1 is the same as at the third point of time t3. This time the reset switch 50 is OFF. The charge is stored in the capacitance 40 of the circuit node and the second capacitor 80. This level is later stored in the second capacitor 80. So if the threshold voltage of the transfer transistor 30 varies, low and high light signal level will vary accordingly. But after adding them together (high light value gained up) they construct a linear line. Thus, knee point calibration is achieved and FPN is reduced.

FIG. 1C shows an exemplary timing diagram performed by a pixel arrangement 10 which is shown e.g. in FIGS. 1A and 1B. The following signals are shown as a function of a time t: The transfer signal TX, the reset signal RST, the coupling signal DCG, the first control signal S1, the second control signal S2 and the further reset signal PC.

An example of the general operation is as follows:

During an exposure phase E the transfer signal TX is pulsed to some partial level a first number M of times and charge is drained through pulses of the coupling signal DCG and of the reset signal RST to the supply terminal 17. The photodiode 20 can only hold a limited value of the charge Q. So part of the charge Q is drained to the supply terminal 17 through pulses of the transfer signal TX. Since the T0/T1/T2 ratio is known, a signal representing the illumination ILL is reconstructed by an evaluation circuit and accounts for this lost charge by this ratio.

The coupling signal DCG goes high and the transfer signal TX is pulsed to a first pulse level V1 transferring a fraction of the charge Q of the photodiode 20 to the capacitance 40 of the circuit node and to the second capacitor 80 (LCG Read).

The coupling signal DCG goes low and the remaining charge Q of the photodiode 20 is transferred to the capacitance 40 of the circuit node (HCG Read). The HCG read also contains the first calibration level used in post processing to remove FPN caused by variations in the transfer transistor 30. The first calibration level will also be used as a reference to remove FPN variation caused by the additional n-1 pulses that occurred during integration.

The operation includes e.g. a reset phase R, the exposure phase E and the storage phase GS. The storage phase GS follows the exposure phase E. The exposure phase E follows the reset phase R.

During the reset phase R, between a first point of time t1 and a second point of time t2, the transfer transistor 30, the reset transistor 50 and the coupling transistor 105 are set in a conducting state by a pulse of the transfer signal TX, the reset signal RST and the coupling signal DCG. Between the first point of time t1 and the second point of time t2, the pixel arrangement 10 performs a global reset of the photodiode 20 and of the capacitance 40 of the circuit node.

During the exposure phase E:

The start of the exposure phase E is at the second point of time t2. At the start of the exposure phase E, each of the transistors is set in a non-conducting state. A pulse of the transfer signal TX and a pulse of the reset signal RST are between a third point of time t3 (which is after the second point of time t2) and a fourth point of time t4. The pulse of the transfer signal TX has a first voltage value V1.

A further pulse of the transfer signal TX and a pulse of the reset signal RST are between a fifth point of time t5 (which is after the fourth point of time t4) and a sixth point of time t6. The further pulse of the transfer signal TX has a further voltage value V3. In an example, V1>V3. In case V1>V3, the barrier resulting from the further voltage value V3 is higher than the barrier resulting from the first voltage value V1.

Parts of the charge Q of the photodiode 20 are conducted to the supply terminal 17 by the pulses of the transfer signal TX and the pulses of the reset signal RST. Between the third point of time t3 and the fourth point of time t4, charge Q of the photodiode 20 is thrown away to the supply terminal 17. In other words, during exposure before the third point of time t3, the illumination ILL generates charge at the photodiode 20 which reduce the voltage at the photodiode 20 with respect to the supply voltage VDD. Between the third point of time t3 and the fourth point of time t4, the voltage at the photodiode 20 rises to a certain extent but does not rise up to the supply voltage VDD.

Between the fourth point of time t4 and the fifth point of time t5, the illumination ILL generates further charge at the photodiode 20 which reduce the voltage at the photodiode 20 with respect to the supply voltage VDD again. Between the fifth point of time t5 and the sixth point of time t6, the voltage at the photodiode 20 rises to a certain extent but does not rise up to the supply voltage VDD; thus, charge Q of the photodiode 20 is thrown away to the supply terminal 17 again.

During a total exposure time T3, the transfer signal TX is pulsed to a first voltage value V1 (named partial voltage level) and part of the charge Q of the photodiode 20 is drained to the supply terminal 17. Sometime after, the transfer signal TX is pulsed again to a further voltage value V3. The time between the pulses having the first voltage value V1 and the further voltage value V3 is denoted as T1. The time after the pulse with the further voltage value V3 is denoted as T2. The time between the start of the exposure phase E and the start of the pulse of the transfer signal TX (time between t2 and t3) is denoted T0. Thus, T3=T0+T1+T2.

Knowing the durations or times T0, T1, T2, and T3 and the first and the further voltage value V1, V3, a linearized signal e.g. representing an illumination of the photodiode 20 can be reconstructed.

The first voltage value V1 is also applied during the storage phase GS so that HCG signal is a knee point calibration value used during linearization and for FPN correction.

Knee point correction for the second voltage value V2 will be mapped and utilizes the first voltage value V1 as an exact calibration value as a reference point.

Any number of pulses can be applied during the exposure phase E. In an example, the transfer signal TX has an additional pulse with an additional voltage value V4. A correction for the pulse with the additional voltage value V4 uses the exact level of the first voltage value V1 as a reference. The further pulse having the further voltage value V3 results in a higher barrier than the additional pulse having the additional voltage value V4.

Storage Phase GS:

The start of the storage phase E is at a seventh point of time t7 which is after the sixth point of time t6. At the start of the storage phase GS, the reset transistor 50 and the coupling transistor 105 are set in a conducting state between the seventh point of time t7 and an eighth point of time t8. Thus, the capacitance voltage VC and the output voltage VO obtain the value of the supply voltage VDD. Between the seventh point of time t7 and the eighth point of time t8, the pixel arrangement 10 performs a global reset of the capacitance 40 of the circuit node.

The transfer transistor 30 and the coupling transistor 105 are set in a conducting state between a ninth point of time t9 (which is after the eight point of time t8) and a tenth point of time t10. The first pulse of the transfer signal RST has the first voltage value V1. Thus, the charge Q of the photodiode 20 is applied to the capacitance 40 of the circuit node and to the second capacitor 80. The capacitance voltage VC and the output voltage VO are reduced by this charge in comparison to the supply voltage VDD. Between the ninth point of time t9 and the tenth point of time t10, the pixel arrangement 10 performs a knee point calibration, wherein charge is moved to the capacitance 40 of the circuit node and the second capacitor 80.

The first and the second transistor 90, 100 are set in a conducting state at an eleventh point of time t11 (which is after the tenth point of time t10). At an twelfth point of time 12 which is shortly after the eleventh point of time t11 the further reset transistor 65 is set in a conducting state. Thus, the first and the second transistor 90, 100 and the further reset transistor 65 are set in a conducting state between the twelfth point of time t12 and a thirteenth point of time t13. Between the twelfth point of time t12 and the thirteenth point of time t13, both switches—the first and the second transistor 90, 100—are on, the first and the second capacitors 70, 80 are discharged by the further reset transistor 65, before they are recharged by the amplifier 60 to their final value. The further reset transistor 65 can be named precharge transistor. Initially, the voltage of the first and of the second capacitor 70, 80 may drop, but the voltage will be charged by the amplifier 60 to get a voltage at the first and of the second capacitor 70, 80 which is proportional to the capacitance voltage VC at the input 61 of the amplifier 60. The further reset transistor 65 provides a bias current for the amplifier 60. Meanwhile the knee point level of the capacitance voltage VC is sampled on both capacitors, namely the first and the second capacitors 70, 80. The second transistor 100 is set in a non-conducting state at the thirteenth point of time t13. At the thirteenth point of time t13, the pixel arrangement 10 performs a high light storage at the second capacitor 80. When the second transistor 100 is switched off, the capacitance voltage VC remains stored on the second capacitor 80.

The transfer transistor 30 is set in a conducting state between a fourteenth point of time t14 (which is after the thirteenth point of time t13) and a fifteenth point of time t15, whereas the coupling transistor 105 remains in a non-conducting state. The second pulse of the transfer signal RST has the second voltage value V2. Thus, further charge Q of the photodiode 20 is applied to the capacitance 40 of the circuit node (but is not applied to the second capacitor 80). The capacitance voltage VC is reduced by this charge in comparison to the supply voltage VDD. Since the first transistor 90 is still in a conducting state between the fourteenth point of time t14 and the fifteenth point of time t15, the amplifier 60 amplifies the capacitance voltage VC and the amplified capacitance voltage VCA is stored in the first capacitor 70. Between the fourteenth point of time t14 and the fifteenth point of time t15, the pixel arrangement 10 transfers the remaining charge Q of the photodiode 20 to the capacitance 40 of the circuit node. V1<V2. The barrier provided by the transfer transistor 30 resulting from the first voltage value V1 is higher than the barrier provided by the transfer transistor 30 resulting from the second voltage value V2.

At a sixteenth point of time t16 (which is after the fifteenth point of time t15), the first transistor 90 is set in non-conducting state. At a seventeenth point of time t17 (which is after the sixteenth point of time t16), the further reset transistor 65 is set in non-conducting state. Between the fifteenth point of time t15 and the sixteenth point of time t16, the pixel arrangement 10 performs a low light storage at the first capacitor 70. The voltage stored by the first capacitor 70 is proportional to the capacitance voltage VC.

Pixel operation in the storage phase GS after the exposures phase E includes:

Reset the second capacitor 80 and the capacitance 40 of the circuit node at the seventh point of time t7.

Partial transfer of the charge Q of the photodiode 20 to the second capacitor 80 and the capacitance 40 of the circuit node using the transfer signal TX with the first voltage value V1 used for barrier modulation during exposure, e.g. between the ninth point of time t9 and the tenth point of time t10.

Reset the second capacitor 80 through the first and the second transistor 90, 100 and the further reset signal PC between the twelfth point of time t12 and the thirteenth point of time t13.

Sample the capacitance voltage VC at the capacitance 40 of the circuit node on the second capacitor 80 (LCG). The capacitance voltage VC represents a high light signal. This is achieved by turning the first and the second transistor 90, 100 and the further reset transistor 65 on, and then turning the second transistor 100 off at the thirteenth point of time t13. The first capacitor 70 is discharged, e.g. between the twelfth point of time t12 and the sixteenth point of time t16.

Transfer the remaining charge Q of the photodiode 20 to the capacitance 40 of the circuit node between the fourteenth point of time t14 and the fifteenth point of time t15.

Sample the capacitance voltage VC on the first capacitor 70 (HCG) between the fourteenth point of time t14 and the sixteenth point of time t16. The capacitance voltage VC represents a low light signal. HCG signal is knee point calibration value used during linearization.

High conversion gain (abbreviated HCG) is a correlated double sampling read (abbreviated CDS read), while low conversion gain (abbreviated LCG) is a differential double sampling read (abbreviated DDS read).

The pixel arrangement 10 may obtain one or more of the following advantages: A low sensitivity signal is stored on the second capacitor 80 and a high sensitivity signal is stored on the first capacitor 70. A good low-light performance and a small area are achieved by utilizing dual conversion gain (DCG) and only two sample-and-hold capacitors 70, 80 instead of more capacitors. Dynamic range is extended by utilizing barrier modulation. The barrier level is self-calibrating (calibration value is HCG signal) without impacting pipeline or performing an additional read and is further extended, because n additional barrier levels can be utilized which further extends dynamic range. The second capacitor 80 is used as capacitance to achieve a low conversion gain (abbreviated LCG), saves area. Thus, it takes less floating diffusion headroom during self-calibration. So the floating diffusion capacitance 40 may be optimized to reduce read noise.

For example, a capacitance of the first capacitor 70 and a capacitance of the second capacitor 80 are equal.

For example, the capacitance of the first capacitor 70 is higher than the value of the capacitance 40 of the circuit node.

For example, the capacitance of the second capacitor 80 is higher than the value of the capacitance 40 of the circuit node.

FIG. 1D shows an exemplary timing diagram performed by a pixel arrangement 10 which is shown e.g. in FIGS. 1A to 1C. FIG. 1D illustrates the readout phase RO that follows the storage phase GS. In the upper part of FIG. 1D, the readout phase RO of a pixel arrangement 10 of a first row and in the lower part of FIG. 1D, the readout phase RO of a pixel arrangement 10 of a row with the number N is shown. Thus, the image sensor 200 comprises the number N of rows. The readout phase RO of the row with the number N is shifted in time with respect to the readout phase RO of the first row.

In a preparation phase RP of the readout phase RO, excess charge of the photodiode 20 is removed (row in readout only). The transfer signal TX obtains the first voltage value V1 resulting in a first barrier level to remove excess charges from the photodiode 20. The reset signal RST sets the reset transistor 50 in a conducting state to clear the capacitance 40 of the circuit node. The select transistor 120 is set in a conducting state. The preparation phase RP starts after the seventh point of time t17.

In a first phase R1 of the readout phase RO, the output voltage VO provided at the second capacitor 80 is sampled on the column line 130 through the further amplifier 110 and the select transistor 120. Thus, a high-light level is sampled. The first digitized value is generated. The first phase R1 follows the preparation phase RP.

In a second phase R2 of the readout phase RO, the voltage of the first capacitor 70 is sampled on the column line 130 through the further amplifier 110 and the select transistor 120. Thus, a low-light level is sampled. The second digitized value is generated. In this phase, the second transistor 100 is set in a conducting state to equalize the voltages at the first and the second capacitors 70, 80. The second phase R2 follows the first phase R1.

In a third phase R3 of the readout phase RO, the reset of the capacitance 40 of the circuit node and the sampling on the first and the second capacitor 70, 80 is stopped. The reset signal RST is low and sets the reset transistor 50 in a non-conducting state to freeze a reset level of the capacitance 40 of the circuit node. The coupling transistor 105 receives a pulse of the coupling signal DCG to sample the reset level of the capacitance voltage VC in same condition as the signals are sampled in the storage phase GS (as RSTh1 is sampled in a frame overhead time, abbreviated FOT. RSTh1 is a reset gate high bias: In case a voltage having the value RSTh1 is provided to the reset transistor 50, the reset transistor 50 is set in a conducting state). In the FOT, the reset and signal level of the entire frame is sampled to the first and the second capacitor 70, 80. The FOT is basically the period between the seventh point of time t7 and the seventeenth point of time t17. The first transistor 90 is set in a conducting state and the second transistor 100 is still in a conducting state to sample the reset level of the capacitance voltage VC on the first and the second capacitor 70, 80. The third phase R3 follows the second phase R2.

In a row readout time, abbreviated ROT, the voltage at the first capacitor 70 and the output voltage VO at the second capacitor 80 are read; this means that the voltage at the first capacitor 70 and the output voltage VO at the second capacitor 80 (which are analog voltage levels) are converted into digital numbers by an analog-to-digital converter, e.g. each row at a time.

In a fourth phase R4 of the readout phase RO, the reset level of the capacitance voltage VC is frozen on the second capacitor 80. To freeze the sampled reset level on the second capacitor 80, the second transistor 100 is set in a non-conducting state. The first transistor 90 is set in a non-conducting state afterwards. The fourth phase R4 follows the third phase R3.

In a fifth phase R5 of the readout phase RO, the high-light reset level is sampled from the second capacitor 80 on the column line 130. The third digitized value is generated. The fifth phase R5 follows the fourth phase R4.

The third to the fifth phase R3, R4, R5 show details of the block 162 of FIG. 1B.

Figure 1E:
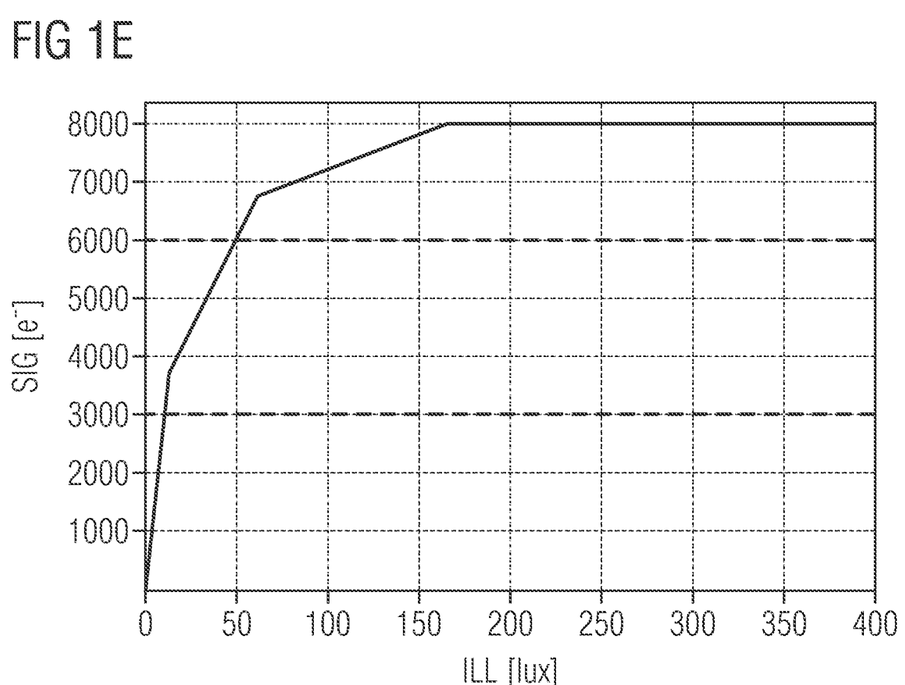

FIG. 1E shows an exemplary characteristic of a pixel arrangement 10 which is shown e.g. in FIGS. 1A to 1D. A response signal SIG is shown as a function of an illumination ILL. The example implements multiple knee points, namely two knee points.

Figure 2:
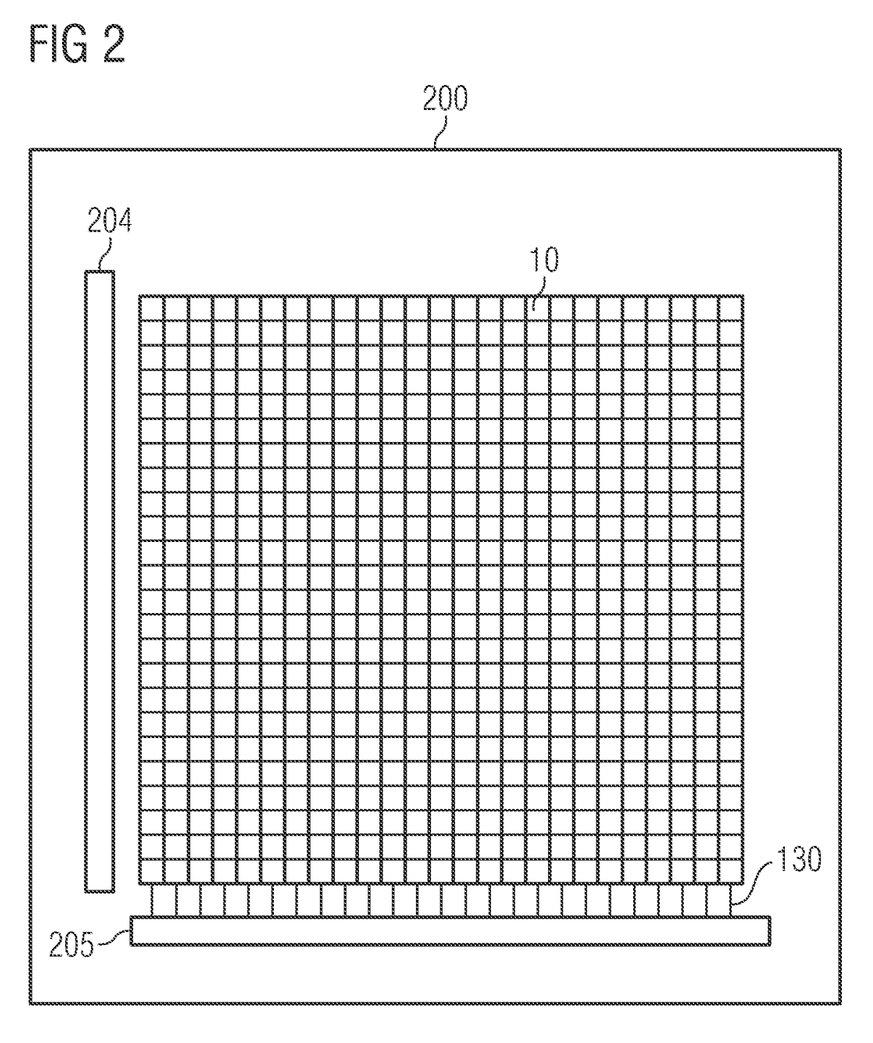
FIG. 2 shows an exemplary embodiment of an image sensor with a pixel arrangement.

FIG. 2 shows an exemplary embodiment of an image sensor 200 with a pixel arrangement 10 which is further development of the embodiments shown in FIGS. 1A to 1E. The image sensor 200 comprises an array of pixel arrangements 10. Moreover, the image sensor 200 further comprises a timing generator 204 that provides the transfer signal TX, the coupling signal DCG, the reset signal RST, the further reset signal PC, the first control signal S1, the second control signal S2 and the select signal SEL. The timing generator 204 provides these signals for each of the rows. The image sensor 200 includes an evaluation circuit 205 for digitizing the signals at the column lines 130.

Figure 3:
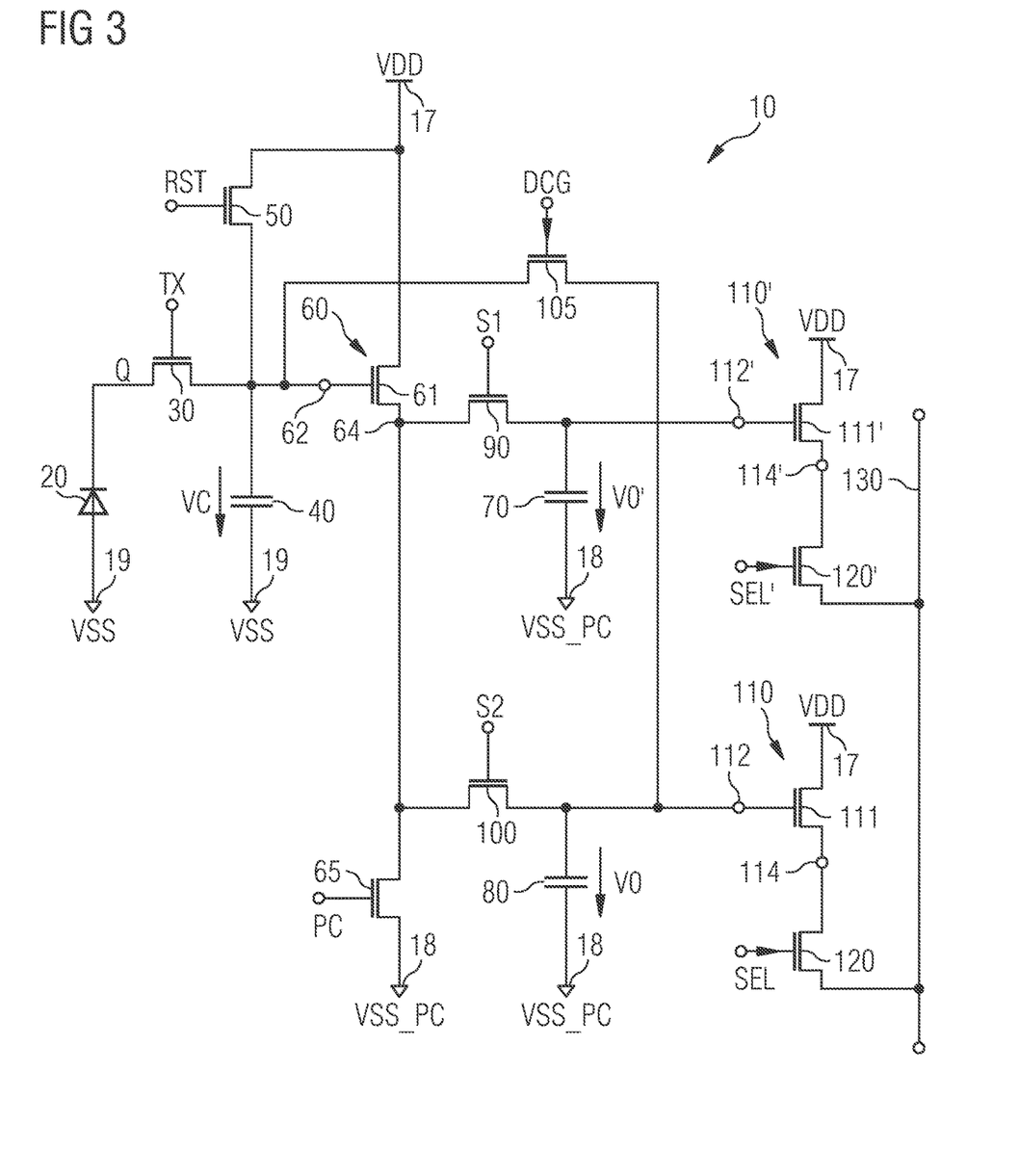
FIGS. 3 and 4 show further exemplary embodiments of a pixel arrangement.

FIG. 3 shows an exemplary embodiment of a pixel arrangement 10 which is further development of the embodiments shown in FIGS. 1A to 1E and 2. The pixel arrangement 10 further comprises an additional amplifier 110' having an input 112' coupled to the first capacitor 70 and an output 114' coupled to the column line 130. The pixel arrangement 10 further comprises an additional select transistor 120' that is coupled to the column line 130 and to the output 114' of the additional amplifier 110'. The second transistor 100 couples the output 64 of the amplifier 60 to the second capacitor 80.

Figure 4:
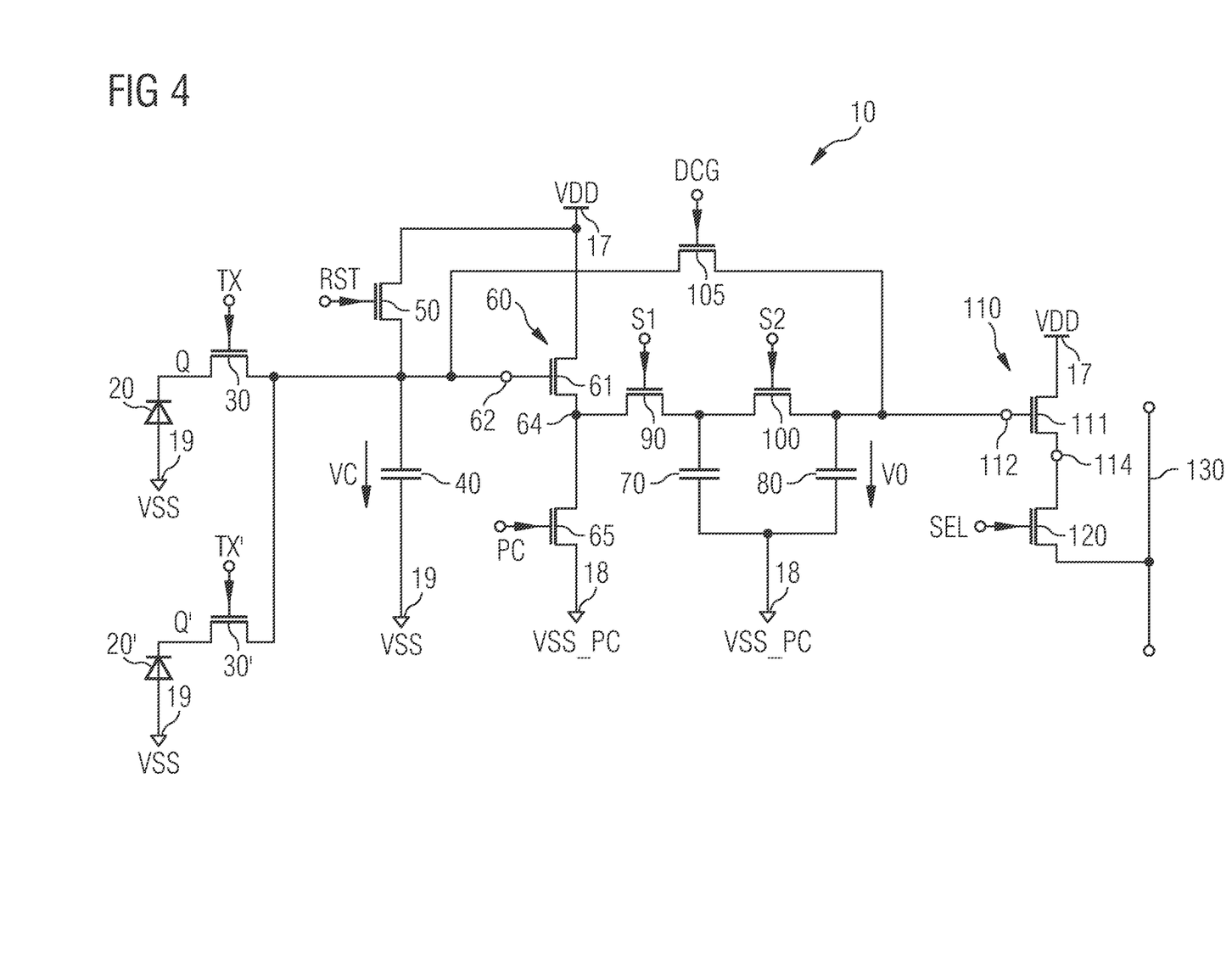

FIG. 4 shows an exemplary embodiment of a pixel arrangement 10 which is further development of the embodiments shown in FIGS. 1A to 1E, 2 and 3. The pixel arrangement 10 further comprises a further photodiode 20' and a further transfer transistor 30' that is coupled to the further photodiode 20' and to the circuit node. Electromagnetic radiation is converted into a charge signal by generating a first charge signal in a high sensitivity mode by the first photodiode 20 and generating a second charge signal in a low sensitivity mode by the second photodiode 20'.

The pixel arrangement 10 is used e.g. in a voltage domain global shutter pixel, abbreviated VGS pixel. The pixel arrangement 10 is implemented e.g. as a rolling shutter pixel. In the image sensor 200, one of the reads is used as the knee point calibration in a barrier modulation HDR scheme (HDR is the abbreviation for high dynamic range). In the image sensor 200, one of the reads is used as the knee point calibration and additional knee points are used and calibrated using the first knee point as a reference level.

The present disclosure is not limited to the description of the embodiments. Rather, the present disclosure comprises each new feature as well as each combination of features, particularly each combination of features of the claims, even if the feature or the combination of features itself is not explicitly given in the claims or embodiments.

We claim:

1. A pixel arrangement, comprising:
    a photodiode,
    a circuit node,
    a transfer transistor coupled to the photodiode and to the circuit node,
    an amplifier with an input coupled to the circuit node,
    a first and a second capacitor,
    a first transistor coupled to an output of the amplifier and to the first capacitor,
    a second transistor coupled to the first transistor and to the second capacitor, and
    a coupling transistor coupled to the circuit node and to the second capacitor.

2. The pixel arrangement of claim 1, further comprising:
    a supply terminal and
    a reset transistor coupled to the circuit node and to the supply terminal.

3. The pixel arrangement of claim 1, further comprising:
    a reference potential terminal and
    a further reset transistor coupled to the output of the amplifier and to the reference potential terminal.

4. The pixel arrangement of claim 1,
    wherein the first capacitor comprises
        a first electrode coupled to a node between the first transistor and the second transistor and
        a second electrode coupled to a reference potential terminal, and
    wherein the second capacitor comprises
        a first electrode coupled to a node between the second transistor and the coupling transistor and
        a second electrode coupled to the reference potential terminal.

5. The pixel arrangement of claim 4,
    wherein a supply voltage is tapped at the supply terminal, a reference potential is tapped at the reference potential terminal and the supply voltage is positive with respect to the reference potential.

6. The pixel arrangement of claim 1, further comprising:
    a further photodiode and
    a further transfer transistor that is coupled to the further photodiode and to the circuit node.

7. The pixel arrangement of claim 1,
    wherein the amplifier includes an amplifier transistor having:
        a control terminal coupled to the input of the amplifier,
        a first terminal coupled to the supply terminal and
        a second terminal coupled to the output of the amplifier.

8. The pixel arrangement of claim 1, further comprising:
    a column line and
        a further amplifier having an input coupled to the second capacitor and an output coupled to the column line.

9. The pixel arrangement of claim 8,
    wherein the further amplifier includes a further amplifier transistor having:
        a control terminal coupled to the input of the amplifier,
        a first terminal coupled to the supply terminal and
        a second terminal coupled to the output of the amplifier.

10. The pixel arrangement of claim 8, further comprising a select transistor coupled to the column line and to the output of the further amplifier.

11. The pixel arrangement of claim 8, further comprising an additional amplifier having an input coupled to the first capacitor and an output coupled to the column line.

12. The pixel arrangement of claim 11, further comprising an additional select transistor coupled to the column line and to the output of the additional amplifier.

13. An image sensor comprising an array of pixel arrangements according to claim 1.

14. The image sensor of claim 13, further comprising a timing generator configured to provide a transfer signal to a control terminal of the transfer transistor, wherein a first pulse of the transfer signal has a first voltage value, a second pulse of the transfer signal has a second voltage value, and the first voltage value is different from the second voltage value.

15. A method for operating a pixel arrangement, comprising:
    converting electromagnetic radiation into charge by a photodiode,
    providing a pulse of a reset signal to a reset transistor and a pulse of a coupling signal to a coupling transistor for providing a supply voltage to a capacitance of a circuit node and a second capacitor,
    providing a first pulse of a transfer signal to a transfer transistor and a pulse of the coupling signal to the coupling transistor for transferring charge from the photodiode to the capacitance of the circuit node and to the second capacitor,
    providing a second pulse of the transfer signal to the transfer transistor for transferring further charge from the photodiode to the capacitance of the circuit node, and amplifying a capacitance voltage that is tapped at the capacitance of the circuit node and providing an amplified capacitance voltage to a first capacitor by providing a pulse of a first control signal to a first transistor.

16. The method of claim 15,
wherein the first pulse of the transfer signal has a first voltage value, the second pulse of the transfer signal has a second voltage value, and the first voltage value is different from the second voltage value.

17. The method of claim 15,
wherein in a readout phase, first the second capacitor is readout via a column line and then the first capacitor is readout via the column line.

18. The method of claim 17, wherein in a readout phase, the capacitance of the circuit node is reset and a reset level is read out via the column line.

19. The method of claim 15,
wherein during converting electromagnetic radiation into charge by the photodiode, a first number of pulses of the reset signal and a first number of pulses of the transfer signal are provided.

\* \* \* \* \*